United States Patent [19]
Secunda et al.

[11] 4,323,424
[45] Apr. 6, 1982

[54] LIQUID-SOLIDS SEPARATION PROCESS

[76] Inventors: David J. Secunda, 3500 E. Lincoln Dr., Phoenix, Ariz. 85018; Lloyd Motz, 815 W. 181st St., New York, N.Y. 10027

[21] Appl. No.: 181,313

[22] Filed: Aug. 25, 1980

[51] Int. Cl.[3] .............................................. B01D 1/16

[52] U.S. Cl. ................................ 159/48 R; 159/2 R; 159/DIG. 26; 159/4 S; 159/9 R

[58] Field of Search ..................... 159/2 R, 48 R, 4 S, 159/4 R, DIG. 2, DIG. 1, DIG. 26

[56] References Cited

U.S. PATENT DOCUMENTS 1,962,781 6/1934 MacLachlan ........................ 159/4 S
2,887,390 5/1959 Coulter et al. .................... 159/48 R
3,039,107 6/1962 Bradford ........................... 159/48 R
3,432,636 3/1969 Sargeant ..................... 159/DIG. 26
3,562,768 2/1971 Edquist et al. .................... 159/48 R

*Primary Examiner*—Norman Yudkoff

[57] ABSTRACT

Liquid compositions containing solid or semi-solid constituents are resolved by atomizing the liquid to droplets of approximately 0.5 to 6 microns diameter, projecting the droplets at speed of 600 feet per second to sonic velocities into an ambient air entrainment zone wherein the droplets lose water rapidly by evaporation within a short distance, e.g., 30 cm. from their point of ejection, and recovering solids and liquids from the entrainment zone. The entire process is conducted at ambient temperature in the absence of any added heat.

12 Claims, 8 Drawing Figures

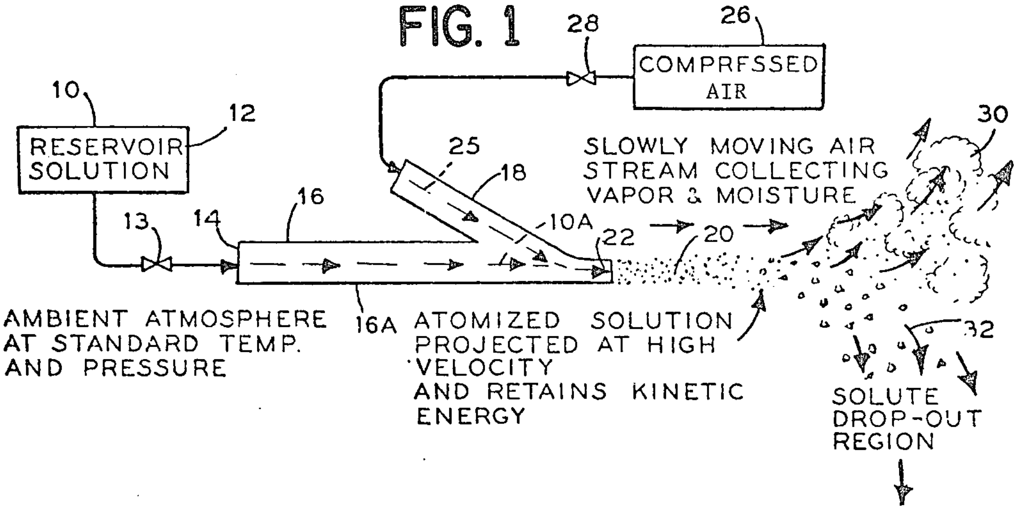

FIG. 1

- 10 RESERVOIR SOLUTION
- 26 COMPRESSED AIR
- 28, 25, 18, 12, 13, 14, 16, 10A, 22, 20
- 30 SLOWLY MOVING AIR STREAM COLLECTING VAPOR & MOISTURE
- 32 SOLUTE DROP-OUT REGION
- 16A ATOMIZED SOLUTION PROJECTED AT HIGH VELOCITY AND RETAINS KINETIC ENERGY
- AMBIENT ATMOSPHERE AT STANDARD TEMP. AND PRESSURE

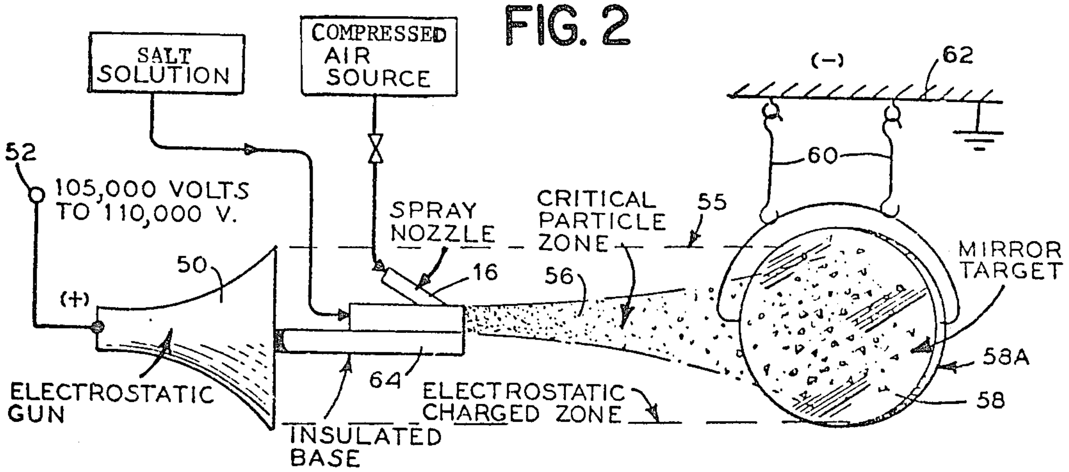

FIG. 2

- SALT SOLUTION
- COMPRESSED AIR SOURCE
- 52  105,000 VOLTS TO 110,000 V.
- 50 (+) ELECTROSTATIC GUN
- SPRAY NOZZLE 16
- 64 INSULATED BASE
- 56 ELECTROSTATIC CHARGED ZONE
- 55 CRITICAL PARTICLE ZONE
- 60, 62 (−)
- 58, 58A MIRROR TARGET

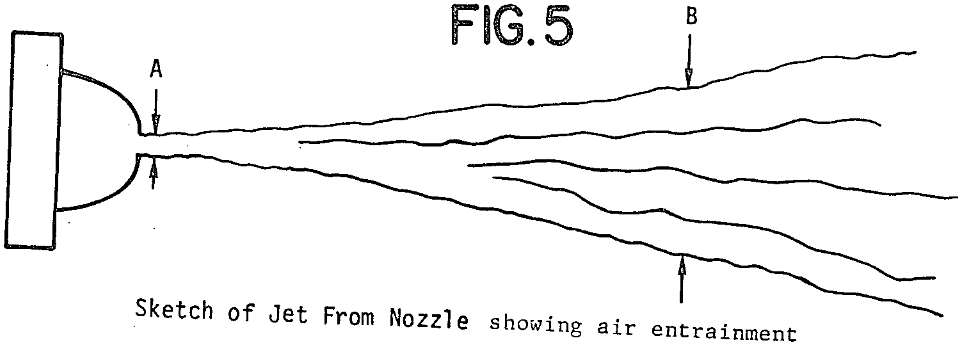

FIG. 5

Sketch of Jet From Nozzle showing air entrainment

A  B

Temperature and Evaporation Time Vs. Relative Humidity.

Temperature and Evaporation Time for Saturated Salt Solutions at Room Temperature of 20°C (68°F) and 10°C (50°F).

LIQUID-SOLIDS SEPARATION PROCESS

This invention relates to a separation process in which solid components of a liquid composition are separated therefrom by means of a novel evaporation-diffusion process. The process is applicable to true liquid solutions, e.g., salt solutions, suspensions of solids or semi-solids in emulsions, etc.

The separation is accomplished by atomizing the liquid composition to droplets of about 0.5 to 6 microns in diameter such as by mechanical means, and projecting the atomized liquid in the form of a fine spray at high velocity of the order of 600 feet per second up to sonic velocities into a mass of relatively dry air at substantially standard temperature. The result is a spray of very finely-divided droplets moving extremely rapidly in the air entrainment zone so that liquid evaporates therefrom in a very short travel distance, the droplets becoming smaller in diameter (e.g. 1 to 3 microns or less) through loss of liquid. The resulting solid particle, free of evaporating liquid, rapidly settles in the entrainment zone. When applying the process to an aqueous 15% NaCl solution, dehydrated salt is recovered within 30 cm. from the point of ejection from the nozzle. The operation is conducted at room temperature in the absence of any extraneously added heat.

Atomization of the liquid composition is accomplished by any means known in the art, especially by the mechanical atomization accomplished by passing the liquid under pressure through a pneumatic atomizing nozzle with the force of compressed gases, e.g., compressed air of approximately 50 to 150 psi, or by the use of a spinning disk type of apparatus equipped with spaced cups and capable of rotation at speeds of 50,000 rpm. The atomizing equipment is more fully described below in the specification and drawings. Suitable atomization may also be accomplished by forcing the liquid under high pressure through minute openings and by other known techniques, but the above venturi nozzle and spinning disk techniques are preferred and recommended.

THE PRIOR ART

Conventional separation processes, drying techniques, etc. of the prior art are exemplified by the patents mentioned below. Suffice it to say that these patents show processes utilizing high temperature gaseous streams or beds of high temperature solids carrying large quantities of heat to vaporize the liquid or aqueous component of the system being treated. Thus, the patents disclose, or have reference to, such conventional methods as spray drying, prilling, fluid bed drying techniques, etc.

U.S. Pat. No. 2,118,252 of May 24, 1938, to Kraft, shows a system for drying whey, to produce a non-hygroscopic powder, by subjecting the wet whey during one of the processing steps, to the action of hot drying air. The temperature of the processing air is initially raised to approximately 300 degrees F., and the material is also mixed with other already air-processed material, to lower the effective operating temperature to approximately 220 degrees F. It will be noted that those operating temperatures are above the boiling point of water, so that some volatiles could be lost by evaporation, in spite of corrective cooling.

U.S. Pat. No. 2,297,726, issued Oct. 6, 1942 to Stephanoff, utilizes a heated air stream to aspirate and carry the material to be treated in the aspirating air stream. There, the heated aspirating stream provides the heat of evaporation to evaporate the moisture from the solution aspirated and picked up into the heated air stream.

U.S. Pat. No. 2,835,955, issued May 27, 1958 to Ofner, shows a system for treating an aqueous slurry of wheat solids in water, derived during or prior to the milling operation for preparing flour. According to the patent, the material being processed is disposed in driers maintained at an elevated temperature of 180° F. during the drying process.

U.S. Pat. No. 3,699,662, issued Oct. 24, 1972, to Stephanoff, discloses a system for drying wet pulverulent material, and uses an external heat system with "very high temperatures", above the deterioration temperature of the material being dried, with suitable compensating equipment intended to protect against any such possible deterioration.

U.S. Pat. No. 3,814,316, issued June 4, 1974, also to Stephanoff, shows a drying system, for liquid solutions or dispersions of granular material projected into space, through a nozzle, and entrained in a heated gaseous stream, such as air or superheated steam, and the like, for the drying operation.

U.S. Pat. No. 3,231,413, issued Jan. 25, 1966 to Berquin, describes a method for granulating solids, such as fertilizers, by passing a stream of atomized particles into a gaseous flow stream and both the streams are coaxially projected from top to bottom through a solid bed of granular cores or seed material. In this method the drying and granulation requires the application of heat. Thus, alternatively, the bed may be heated and the streams cold, or the bed may be cold and the projecting streams heated. The projecting flow is conducted at velocities low enough so as not to disturb the seed bed; and the gases emerging from the bed are hot and must be cooled and recovered. The heat requirements of these methods are in sharp contrast to applicant's ambient temperatures. Applicant employs no beds of solids, but rather a high volume free air zone for the projection of the spray, and practicle velocities many magnitudes higher than the superficial velocities of Berquin. To attempt to utilize applicant's method in Berquin's system would result primarily in blowing Berquin's seed bed out the top of the vessel at quite a speed.

U.S. Pat. No. 3,214,260, issued Oct. 26, 1965 to Oi et al., utilizes a rotating spray nozzle to introduce preheated (100° C.) acidic particles of about 2 mm. diameter into a reaction chamber containing ammonia for conversion of the particles to the ammonium salt. The spray nozzle of Oi et al. neither functions like applicant's preferred equipment nor is of the same design or construction.

APPLICATIONS AND ADVANTAGES OF THE INVENTION

The separation process of this invention is suitable for a great number of commercial operations, and is especially beneficial where rapid separations are desired or where elevated operating temperatures would be detrimental. The most general application of the invention is for dehydration processes. Typical examples of the application for solids removal from liquids are the desalination of water, demineralization of water, pollutant removal, etc. Many dehydration and treating processes demand precision control against damage or detrimental effects on the material to be recovered. Thus, the process is applicable to the dehydration of blood or plasma, and to the treatment of solutions of drugs or medicinals where conditions of prolonged time or temperature could produce detrimental effects.

One of the more obvious applications of the process herein described lies in the field of food processing. In the commercial production of foodstuffs at the present time solutions thereof are often employed for easier handling and processing, and the solutions are ultimately treated in one or more steps, e.g. spray drying, to extract the food constituent. Most food products are more or less sensitive to heat deterioration. When used in food processing, the process of this invention obviates the heating of the food solution to a deterioration point, and thereby any possible spoilage due to high temperature is avoided. Further, any volatile constituents that control the flavor qualities of the food are not affected or lost as often occurs with conventional spray drying processes. Examples of applications to the food treating industry are: the manufacture and processing of fruits, vegetables and juices thereof; the manufacture and processing of corn and corn products, of sugar from cane and beets, of milk and milk products such as cheese, butter, whey and non-dairy substitutes therefor; the dehydration of eggs; the processing of yeast, gelatin, etc.

The process has also found applicability to the processing of polymeric materials and products containing polymers, e.g. latex, etc.

The advantages of the application of the present invention lie in the avoidance of the expense of the heat energy presently required by the typical conventional separation processes, e.g. distillation, in which vast amounts of heat are necessary to evaporate a liquid such as water. Similarly, the high cost of solvents and their recovery is avoided in those cases where solvent extraction would be employed as the conventional method of separation. Since, except for the use of compressed air, the entire separation process operates at ambient temperatures and pressures, equipment costs are minimized. In addition to the economies of energy, material and equipment, preservation of quality of the recovered materials. e.g. foods and medicines, etc., leads to substantial monetary value.

APPARATUS

The apparatus for pressurizing the liquid system and for projecting the droplets as a spray is shown in two modifications herein.

The most preferred modification utilizes a venturi nozzle to receive and distribute the liquid and with the force of a high pressure gas (air) against the liquid to pressurize it and project it from the nozzle in the form of droplets into an ambient air space at very high speeds so that rapid evaporation of the liquid in the droplets takes place. A typical venturi nozzle is more fully described later.

In a second modification, a spinning cup or disk, likewise available commercially, is disposed to receive a continuous stream of liquid at low speed, and the cup is driven at high speed up to 50,000 revolutions per minute, first to accelerate the feed liquid progressively to the point of the required pressurization and then to project the pressurized stream at velocities up to sonic speeds into the ambient air as described above. The cup or disk is capable of rotation at high speeds around a horizontal axis, and is provided with a small bottom or back co-axial inlet opening to receive the feed stream. To establish the high angular velocity of the spinning cup, a high-speed motive device, such as a high-speed air turbine, has been found suitable to drive the cup. The cup has a diameter of four inches at its top or open end.

In order to establish some confinement control for the separated solids, for the emerging vapors and for the travelling droplet path itself, the particles, in transit, may be controlled or confined in their travel by the application thereto of an electrostatic field produced from well-known commercial equipment. Thus, a field of about 100,000 volts may be set up in the entrainment zone. The electrostatic charge is produced by a high voltage power source as one terminal and a collector device for solids as the other. The collector is shown in the drawings in one form as a slowly moving rotating disk or drum on which the solid collects to be removed by a conventional scraper device. To locate the electrostatic field, an open cylinder is disposed co-axially around the spinning cup and turbine assembly, and the cylinder is connected to the positive terminal of the power supply to direct the field from the front end of the open cylinder to the collector which is at ground potential.

With respect to product recovery apparatus, the vaporized liquid component is removed in vapor form with the aid, preferably, of some suction or vacuum device, and subsequent condensation. Entrained solids of the finer type are recovered from the vapor stream by use of such standard equipment as Cottrell precipitators or their equivalent.

The invention is not restricted in its use to any of the above equipment, and other devices capable of producing the pressurization and high speed projection may be substituted therefor. For example, the spray of droplets of required size may be produced by forcing the liquid under pressure through a small aperture, e.g. a small micron diameter sized hole, or by projecting a stream of liquid against a rapidly rotating disk.

THE PROCESS

In its preferred embodiment which will be described first, applicant's process involves passing a liquid system to be resolved (e.g. a 15% NaCl aqueous solution) through a venturi nozzle together with a stream of compressed air (e.g. 70–100 psi) under set and controlled rotameter flows. The nozzle sprays the liquid in the form of minute droplets into a receiving entrainment zone containing a large volume of ambient-temperature "free" air. The entrainment zone has an exhaust fan or similar suction device at the far end remote from the nozzle for removal of vaporized liquid and humidity control. After prolonged operation, the floor and walls of the entrainment chamber become covered with dehydrated NaCl product.

The surprising ability of the process to accomplish such extensive dehydration is made evident by placing an intercepting device, e.g. one's hand, a card, metal or glass plate about one foot from the nozzle and directly in the emerging spray. At this point completely dry salt is collected on the device. As one moves the device closer to the nozzle, liquid solution becomes collected thereon. No external heat is applied during the evaporation.

Since the mechanism of the phenomenon was not clearly apparent, arrangements were made to holographically record the spray. Due to the small droplet sizes, conventional photographic techniques would not work because of the depth of focus limitation imposed by microphotography. The visual evidence by which the resolution of the liquid (dehydration) takes place was provided by holographic studies conducted in a commercial laboratory of recognized holographic expertise. The mechanism of dehydration reported herein is a result of such holographic studies. For example, by means of holography certain crucial elements of the phenomenon were ascertained and measured, e.g. spray droplet sizes; spray droplet velocities; solids particle size; evaporation and drying times in relation to size; the extent of droplet travel in the free air zone from nozzle ejection (settling times); etc. This aspect of the study is related more fully below.

The invention will be more readily understood from the narrative read in connection with reference to the drawings.

FIG. 1 is a schematic view of one modification of the system showing the essential basic features of the invention.

FIG. 2 is a schematic view, similar to but more detailed than, FIG. 1 and illustrates the provision of an electrostatic field in the entrainment zone for the restriction and collection of the solid particles.

FIG. 5 is a schematic view of the atomizing jet nozzle atomizing device and depicting the projection into the air entrainment zone.

Figure 3:
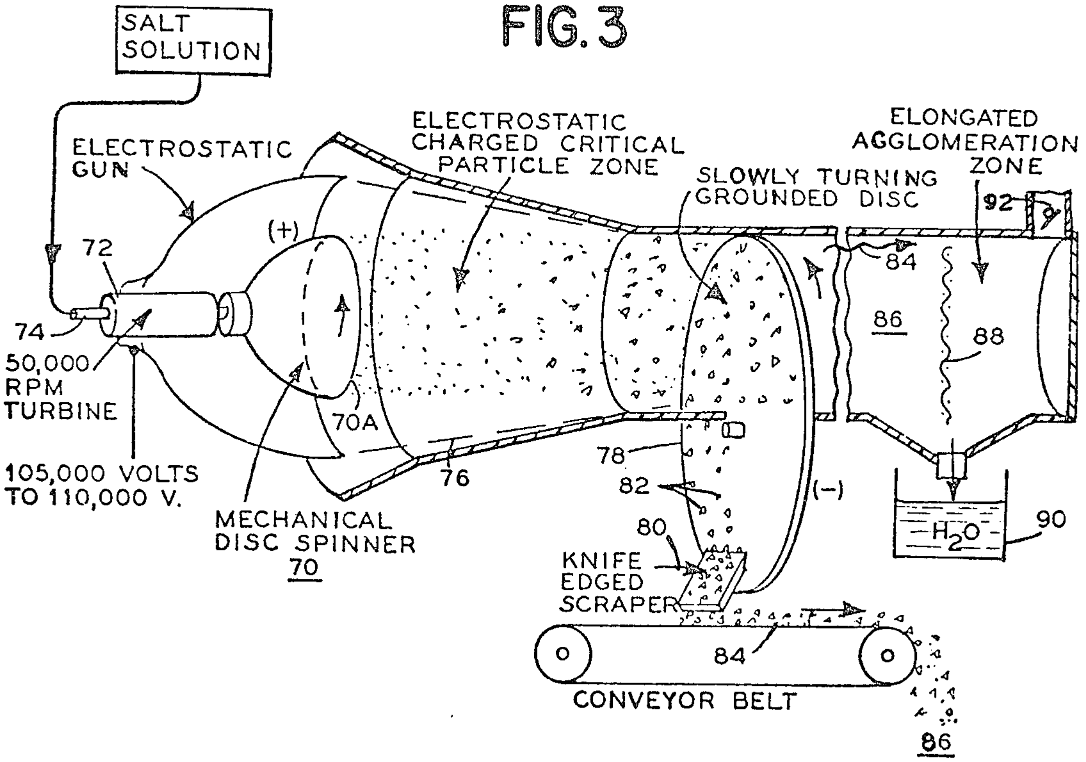
FIG. 3 is a schematic view of a modification of the invention in which the atomizing device is a spinning cup or disk, capable of rotating at speeds of about 50,000 rotations per minute.

Referring to FIG. 1, a solution 10, stored in a reservoir 12, is supplied at low pressure through a control valve and conduit 13, to the input end 14 of an atomizing nozzle device 16 that has an input air-jet channel 18 for guiding a high pressure air stream against a stream of the solution 10 flowing through the atomizing nozzle 16, to atomize the solution progressively and to project the atomized particles 20 at high velocity of about 600–800 ft. per second, or up to sonic speed, as desired, out of the output end 22 of the nozzle 16, to impart kinetic energy to the particles 20, for the performance of the present process. The high pressure air stream 25 is schematically indicated as being derived from a source 26 of compressed air—typically indicated as at a pressure of seventy to one hundred pounds per square inch—through a conduit and control valve 28.

The high-speed stream 25 of high-pressure air, passes through the channel 18 and engages a relatively thin layer of the solution 10A, on the floor 16A, of the body of the nozzle 16 adjacent the flow or output end 22 of the nozzle.

The rate of feed of the solution 10, and the pressure of the air stream 25 are controlled by the respective valves 13 and 28, to enable the air stream to atomize the solution 10A at the front of the nozzle into liquid droplets of 0.5 to 6 microns in diameter, preferably 1 to 3 microns.

The atomized stream of high-speed particles 20, projected from the nozzle 16, moves through the ambient air in the entrainment zone at high velocity, whereby the liquid thereon progressively evaporates into the entrained air with progressive reduction in diameter to the stage at which the liquid is completely evaporated from the surface of the particle which then settles out of the entrained stream. This evaporation and settling occurs in a matter of milliseconds after projection into the entrainment zone and within a very short distance from the nozzle, e.g. 20 to 30 cm. The system is symbolically indicated, merely to show that the initial solution droplets 20, separate into their components, vapor and moisture 30—going in one direction and the solute drop out 32—going in another direction. The bulk of the settled solid particles have been found to be in the range of 1 to 3 microns diameter, and some particles including those of less than one micron diameter find their way out of the entrainment zone with the evaporated liquid and air making it necessary to provide for their recovery from the vapor by some conventional means, e.g. Cottrell precipitators. All the above data have been observed and measured in connection with the treatment of 15–20 wt.% NaCl solutions in the process and equipment of FIG. 1.

To provide some confining restraint on the fall-out of the solid particles, an electrostatic field is employed, as schematically shown in FIG. 2, in combination with the nozzle of FIG. 1. As shown in FIG. 2, an electrostatic gun 50 is energized from a direct-current source of high voltage 52 to establish an electrostatic field 55, shown to include the path of movement 56 of the particles, labelled "critical particle zone" in the drawing. A mirror target 58 serves as the low-potential terminal for the electrostatic field, and the metallic silver backing 58A of the target is suitably grounded, as shown by the metallic supporting hooks 60, supported from a metallic electrically conductive grounded part of the housing framework 62. For safety, the spray nozzle 16 is supported on an insulating base 64, and electrically insulated from the high-voltage electrostatic gun and its circuitry. By reason of the slight charge which the particles appear to receive in atomization, the electrostatic field keeps the path of movement of the particles reasonably confined and substantially limits the lateral throw of the solid particles upon separation. Appropriate means, not shown in this FIG. 2, may be provided to scrape the solid, here salt, from the target. The effect of the target and the electrostatic field is to prevent uncontrolled free fall of the separated solid particles.

A second modification of the atomizing and projecting device is schematically shown in FIG. 3, as constituting a high-speed spinnning disk or cup 70, for imparting high speed kinetic energy to an atomized system. The spinner 70 is driven by a turbine 72 to obtain the desired high speed, and the solution to be treated for separation is supplied to the spinner at a low-speed region—generally along the axis of rotation—and through an axial conduit 74 of the turbine 72 for such low-speed access to the spinner disk 70. The spinner progressively centrifuges the supplied stream of solution to its outer edge 70A, at which the accelerated solution stream is progressively atomized and thrown out into the air space. The rate of feed of the solution and the speed of rotation of the turbine serve to control the degree of atomization at the departure edge of the spinner cup.

The confining electrostatic field constrains the atomized particles to a predetermined path within a large passage conduit 76 of electrically non-conducting material, to avoid any distorting effect on the electrostatic field.

To provide for separately guiding the solute salt and the solvent or carrier, a turning grounded collector disk 78 is utilized as the low potential terminal for the electrostatic field. The collector disk 78 tends to collect the separated solute, here the salt, and at the low point of its travel, a suitable scraper 80 removes the adhering salt particles 82, from the collector disk 78, so they will drop onto a conveyor belt 84, to be removed to a selected region 86 for collection. The salt particles that separate out at the end exhibited no wetness and appear to be completely dry, although it is possible that a minute condition of hydration may exist.

In the construction shown in FIG. 3, the region identified as the "critical particle zone" is the entrainment zone or region within which the deliquefaction of atomized droplets generally takes place until a separation is effected of the solute from the liquid solvent or carrier. That zone or region is not sharply defined since the separation may take place, as mentioned above, over an axial range of several inches, spaced from the departure point of the projection device, here the spinner 70. The grounded turning disk 78 will attract the solute or salt particles, while the moisture that vaporized and separated from the moving globules will have been absorbed by the ambient air in passage. That ambient air 84, moved by the stream of globules and particles, plus any externally induced movement, will carry the sensible moisture past the grounded disk 78 into a compartment 86, identified as an "elongated agglomeration zone", and containing a moisture-collecting screen 88, through which the ambient air stream will move, after depositing the moisture particles on the screen 88, to drip down into a collecting container, 90. The continuing air stream is guided to an outlet conduit 92, for connection to a suitable external conduit system, to further remove moisture and to recycle the air stream back to the inlet end of the working passage into which the atomized stream of globules is initially projected.

Figure 4:
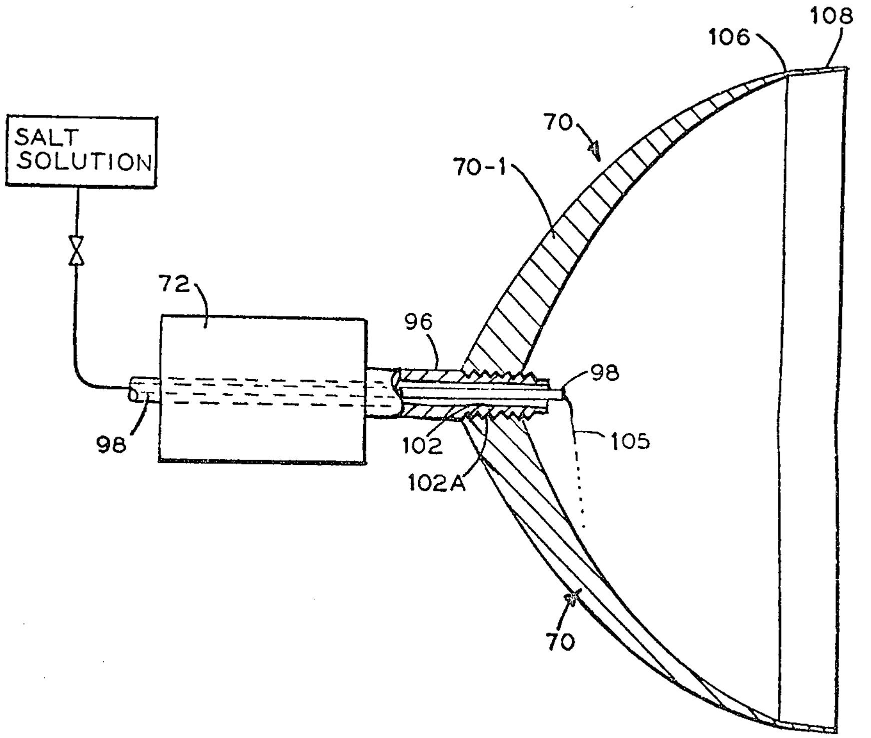
FIG. 4 is a schematic side view, partially in vertical section taken longitudinally along the axis, to show the spinner cup co-axially secured to and rotatable with the rotor of a driving turbine.

FIG. 4 is a schematic enlarged view, in vertical section, that shows one simple arrangement and construction of the spinner 70 and its dispositon on the hollow drive shaft 96 of the driving turbine 72. An inlet pipe 98 is co-axially supported in said drive shaft 96 to be frictionally free of that shaft, which will be rotated at the high speed desired for the spinner 70. The drive shaft 96 has an externally threaded peripheral portion 102, for receiving a similarly threaded axial bore 102A of the spinner. In order to contribute to the formation of small droplets in the atomizing action, the body 70-1 of the spinner 70 will receive and support and accelerate the stream 105 of solution entering from inlet pipe 98, and the spinner will tend to distribute the stream solution progressively into a centrifuged body having a concave contour of a paraboloid of revolution, shaped to it, the forward fine rim edge, which will form by design, approximately at the peripheral line 106 of the spinner at the designed speed of operation. A short annular extension 108, of the spinner cup 70, serves as a compression rim upon which the axially moving centrifuged stream section will be further flattened to a thin ribbon, in axial passage, to be atomized into small droplets, as desired.

The compression rim 108, in addition to squeezing the stream into a thin ribbon, serves to bend the stream, so the departing stream of droplets will have a greater axial component of force, for preferred axial movement.

EXAMPLES-I-A SALT

Applicants conducted a series of experiments in a chamber 8′×8′×8′ (512 cu. ft. volume) to demonstrate the workability of the process for the dehydration of a 15 wt.% salt solution, NaCl. The following table No. 1 is a summary of operating conditions employed in a representative run:

TABLE NO. 1

1. Duration of test - 117 minutes
2. Room temperature - 68° F. (manual recording)
3. Relative humidity of room - 15%
4. Nozzle used - 140/6/37/70 (Spraying Systems Co.)
5. Exhaust air velocity - 880 ft. per minute
6. Solution of salt - 15% NaCl by weight
7. cc of solution (6) sprayed in time (1) - 1550 cc
8. Air pressure - 70 psi
9. Liquid pressure - 55 psi
10. Rotometer reading throughout test - 6.5 (not corrected for calibration error)
11. Pressure in Chamber - 6″$H_2O$
12. Exhaust air:
    (a) Dry bulb - 64° F.
    (b) Wet bulb - 54° F.
13. Comments recorded:
    Chamber remained dry throughout test
14. Chart recordings:
    Room temp. air temp. before nozzle, liquid temp. before nozzle, exhaust temp. and chamber temp. recorded by Dymac throughout run The runs demonstrated clearly the operability of the process when dry salt of about 90% estimated yield was recovered. Table 2 below is a compilation of the material flows, heat and materials balances calculated as closely as experimental conditions would permit.

TABLE NO. 2

| | |
|---|---|
| Chamber Volume | 512 cu. ft. |
| Input Flows: | |
| Atomizing air | 33.0 lbs./hr. |
| Water flow | 0.0875 lb./hr. |
| Feed soln. rate | 1.94 lb./hr. |
| salt rate | 0.29 lb./hr. |
| water rate | 1.65 lb./hr. |
| Secondary air rate | 289 lbs./hr. |
| Water in sec. air | 1.27 lb./hr. |
| Total water entering the chamber | 3.01 lbs./hr. |
| Output Flows: | |
| Exhaust air rate | 325 lbs./hr. |
| Water in exhaust air | 2.83 lbs./hr. |
| Salt rate | Not calculated |
| Salt Accumulation | |
| Salt produced estimated to be about 90% of theoretical from chamber deposits, exhaust coating, and balance lost as fines in exhaust air water vapor. | |
| Heat Balance: | |
| Heat in atomized air | 305 Btu/hr. |
| Heat in atomized air water vapor | 96 Btu/hr. |
| Heat in feed soln. | 63 Btu/hr. |
| Heat in secondary air | 2885 Btu/hr. |
| Heat in secondary air water vapor | 1386 Btu/hr. |
| Total heat entering chamber | 4705 Btu/hr. |
| Heat in accumulated salt | 2 Btu/hr. |
| Heat in exhaust air | 2275 Btu/hr. |
| Heat in exhaust air water vapor | 3080 Btu/hr. |
| Total heat leaving chamber | 5355 Btu/hr. |
| If one considers the heat loss along the thermocouple, and the heat picked up in ducting and in the exhaust fan, the heat balance would give a net heat leaving the chamber of 4860 Btu/hr. | |
| Mass Ratios: | |
| Air to salt | 1120 lbs. air/lb/salt |
| Atomizing air to soln. | 17.0 lb. atom. air/ lb/soln. |

TABLE NO. 2-continued

| Chamber Retention Time (Average for Gas) |
| --- |
| 7.15 minutes |

A few runs were made on a 10 wt.% NaCl solution utilizing the same spray nozzle as above, but with the incorporation of an electrostatic field surrounding the entrainment zone for concentration of the spray particles. The system was substantially that shown in FIG. 2. The mirror target salt collector was moved during the runs but always maintained within a distance between 9 inches and 14 inches from the nozzle ejection point. Dry salt collected on the front, sides and rear of the mirror. Particularly thick sheets of salt attached to the front and rear of the mirror. Recovery of salt was estimated to be about 90 to 100% of the total charged. No visible moisture was apparent on the target. These runs demonstrated the effectiveness of the electrostatic field in concentrating the flow of particles in the droplet stream.

B COFFEE

A solution was prepared from one jar of purchased instant coffee and three jars of water, making a total of 2000 cc. The solution was pumped through the jet nozzle previously described with air pressure of 100 psi and fluid pressure of 70 psi. Dried coffee particles of extremely small size were recovered at a target set 10" from the nozzle outlet. The chamber air had a strong coffee odor, but any particles therein were too minute in size to be detected by the eye. The chamber wall temperature during the run of approximately 30 minutes dropped from 68° F. to 67° F. Spray velocity was approximately 800 ft./second.

C ONIONS

Twelve pounds of peeled chopped onions were mixed in an Oster blender making a 50—50 mixture of onions and water totaling 3400 cc. A like amount of additional water was added and the liquid composition pumped through a typical venturi jet nozzle, air pressure 120 psi, fluid pressure 50 psi. At the target distance of 10", dry onion flakes were visibly seen dropping to the dry chamber floor. Samples of the flakes were recovered and placed in jars and exhibited good shelf life. While maintained in the dry state, the flakes gave off very little onion odor, but the odor reappeared upon wetting.

D FISH

One fresh mackerel, 3 to 4 lbs., was deboned, skinned, and the flesh ground with water (7 parts water per part of fish) in a puree machine (Hobart Mfg. Co.). The puree was atomized by processing through a nozzle of the above type under the following conditions: air pressure 57 psi, fluid pressure 60 psi, temperature 72° F., and humidity 69% to form a spray. Solid fish flake was deposited and collected within 25 cm. of the nozzle outlet. The dry fish was relatively free of odor. The flakes were stored in a glass bottle for a period of about six months without spoilage. Upon re-wetting the fish odor reappeared.

E METAL COMPOUNDS

Six different representative waste water streams from a commercial metal plating plant were combined for testing with respect to solids recovery. The streams contained a variety of metals including compounds of chromium, copper, tin, lead, nickel, sodium, potassium, silver, boron, and zinc. Samples of the combined stream were atomized in a nozzle of the type described above, modified to contain twelve openings drilled at an angle of 30 degrees. Atomizing conditions were: air pressure 115 psi, fluid pressure 75 psi, temperature 70° F., and humidity 48%. Dry powdered metal compounds deposited from the spray within the target distance of 10 inches from the nozzle outlet. The solids were a mix of the metal compounds mentioned above. The waste water still contained some metal content but of a vastly reduced amount.

F LATEX

Rubber latex from commercial rubber operations is normally dried in the sun, an untidy and cumbersome procedure. Rubber latex (55% water) was obtained from a manufacturer and atomized by processing through the nozzle of example (e) above under the following conditions: air pressure 100 psi, fluid pressure 80 psi, temperature 70° F. and humidity approximately 50%. Runs were carried out of 7 to 8 minutes duration each, and latex particles ranging in size from rubber erasings to granules were collected on a plexiglass plate within 10 inches of the nozzle outlet and recovered. Under a microscope the small granules appeared like chips of rock candy.

G SUGAR

A commercial sugar solution (approximately 36% water) was processed through the nozzle of example (e) above under the following conditions: air pressure 120 psi, fluid pressure 90 psi, temperature 75° F., and humidity 28%. Fine powdered sugar emerged from the atomized spray within the target distance (10 cm.). When the target (mirror) was first coated with a little of the fine powder as a base matrix, the deposited sugar took the form of crystals. When treating sugar lower humidity conditions in the air entrainment area are recommended.

H WHEY

Whey is a watery colloid separating from the curd after coagulation in the manufacture of cheese from milk. Its disposal in the dairy industry constitutes a current pollution problem. Samples of whey from a commercial dairy were atomized by processing through the nozzle of example (b) above under these conditions: air pressure 100 psi, fluid pressure 80 psi, temperature 68° F. and humidity approximately 50%. Solid curd, finely divided, greyish white in color and dry to the touch was recovered from the target area location. The separated water from which the solids were removed was clearer and less odorous than the original whey solution.

The above experiments (I-b thru I-h) were conducted to exemplify the wide range of liquid compositions to which the process may be applied. No attempt was made therein to optimize the process conditions nor to obtain accurate analytical data.

All nozzles employed in the above experiments were obtained from Spraying Systems Co., Bellwood, Ill. as standard catalog items.

EXAMPLES II

Equipment such as that described in FIG. 3 was assembled. The atomizing equipment consisted of a pressurized paint sprayer (Ionic Electrostatic Company, Garfield, N.J.) equipped with a 4-inch diameter disk capable of rotating at 50,000 RPM. The disk was of stainless steel and its outer edge was directed slightly inward. A 10% NaCl solution was fed from the sprayer at a rate of about 90 cc. per minute and at about sonic speed. Dry salt deposited from the spray instantaneously. The experiment was conducted at room temperature (about 70° F.) and humidity about 45%.

The above experiment was repeated in the presence of an electrostatic field. The spray gun was charged positively imparting a plus charge to the salt solution particles, and a metal plate negatively charged was placed at a point 30 cm. from the spray projection. As the solution droplets emerged from the spray gun, dry salt particles immediately appeared and piled in front of the metal plate. The salt was recovered in almost theoretical amounts.

Although the process was demonstrated repeatedly by applicants themselves, there was no evident mechanism by which the physics of the process could be explained. Therefore, efforts were made to arrange for a microscopic examination of the spray stream by means of holographic microscopy, and for evaluation of the holographic results thermodynamically to identify the dominant energy transfer mechanisms which occur in the process. These experiments and their evaluation are recorded in the section to follow.

EXAMPLES III

The process as described herein was investigated in the laboratories of a research and development company having holography technology, equipment and techniques capable of recording the existence of the spray, its characteristics and behavior. The laboratory in which the experiments were carried out was air-conditioned. The room temperature was nominally between 18° and 24° C. The humidity ranged at times from a low of 22% relative humidity to a high of 70%, but was nominally between 42% and 50%. The process and apparatus used was substantially that depicted in FIG. 1, viz., the nozzle type of atomization was employed treating saline solutions of 10–20 wt.% NaCl.

The spray nozzle was housed in a 68 cm.×68 cm.×1.82 M long wooden framework chamber lined with polyethylene plastic sheeting. The chamber was connected to an existing chemical fumehood exhaust system. The room air volume passing through the 0.68 M×0.68 M entry aperture was measured to be approximately 0.3 $M^3$/second. The chamber (air entrainment evaporation zone) was constructed such that the side view ports (cut through the polyethylene sheet) could be closed off by ¼" thick plexiglas sliding windows.

The spray nozzle was mounted on an aluminum block fitted to a traversing carriage. The carriage allowed positioning of the nozzle so that any desired axial distance from the nozzle was centered between the cross-view ports of the chamber.

The nozzle, manufactured by Spraying Systems Co., is a six orifice device which sprays collectively in a conical pattern. Typically the air was supplied by the house air supply at approximately 100 psig. The saline solution was usually premixed in 10 liter batches and then placed in a spray reservoir. The house air was used to both feed the nozzle and to generate a head pressure to drive the solution. The specifics of the nozzle were not the subject of investigation, suffice it to say that its performance was more than adequate to accomplish the desired dehydration.

Table 3 below contains a summary of the conditions of operation of the process during the saline dehydration experiments, and measurements of the results occuring during the evaporation. No attempt was made in these experiments to measure the exact amount of salt recovered from the material balance standpoint as economies of operation was not critical therein; however, from observation of the salt deposits on the chamber floor and walls, from encrustation on the air exhaust equipment, and from observation of salt fines in the exhaust air itself, the conclusion was apparent that the aqueous solution was dehydrated and that dehydrated salt was recovered in close to theoretical amounts.

TABLE NO. 3

| DATA SUMMARY | |
|---|---|
| AMBIENT TEMPERATURE | = 20° C. |
| NOZZLE AIR 6 SCF/M | = 3.54 gms/sec (6 jets) |
| WATER FLOW 5.5 ml/min 15% solution | |
| $H_2O$ | = .086 gms/sec (6 jets) |
| NaCl | = .013 gms/sec (6 jets) |
| EXHAUST AIR (2.4 m/sec over .28 m × .48 m = .32 $m^3$/sec) | |
| | = 400 gms/sec |
| JET VELOCITY (on jet axis) | |
| at orifice exit | = 300 m/sec |
| at $\chi_{cm}$ from nozzle | ≅ 300/$\chi_{cm}$m/sec |
| ENTRAINED AIR (conservative assumption, ~ ⅓ of Schlicting formula) | |
| | = 3.54 $\chi_{cm}$gms/sec (6 jets) |
| | = 06 gms/sec at 30 cm |
| | = 53 gm/sec at 15 cm |
| Temperature fall of entrained air due to evaporation of all water, conservative entrainment value, | |
| | = 2° C. at 30 cm |
| | = 4° C. at 15 cm |
| Relative humidity increase due to evaporation and cooling, 40% initial humidity, conservative entrainment value, | |
| | = 11.6% at 30 cm |
| | = 26% at 15 cm |

The following conclusions were drawn from observations and measurements during the conduct of the above experiments:

1. The basis separation mechanism is evaporation.
2. The particles sizes of the spray are very small, i.e. the bulk thereof fall in the range of 1 to 3 micron diameter.
3. A theory developed from experimental observations and measured spray characteristics has been formulated based on classical physical mechanisms. This theory allows prediction of performance on substances whose vapor pressure is known.
4. The relative humidity of the entrainment zone must not be too high or the separation process stops. This humidity limit can be quantitatively determined using the theory of operation developed.

MECHANISMS OF THE PROCESS

Since the basic separation mechanism is evaporation and since no heat is supplied, the questions naturally arise first as to the source of heat to supply the heat of vaporization (590 cal/gm), and second, to the possibility of a particle to make the transition from liquid to solid in such short distance as 20–30 cm.

The picture which has emerged from the experiments and classical physical theory is the following:

The high pressure produced by the compressed air or the rotating disk achieves two things, each of which is essential to the process. First, the high pressure breaks up the liquid into very small atomized droplets. The small size of these particles is essential to the process. Second, the motion of the droplets traveling at high speeds entrains large quantities of ambient air.

A ENTRAINED AIR AND VELOCITY

By entraining large quantities of ambient air, the small droplets evaporate without significantly raising the humidity of the entrained air. Moreover, also because of the large quantities of entrained room air, the cooling of this entrained air by the evaporation process only lowers its temperature a few degrees, permitting the evaporation to go to completion. The heat of vaporization thus comes from the small temperature drop of the large quantity of entrained room air.

The small particle size enables the droplets to evaporate in a time so short that they are dry within about one foot from the nozzle. These particles simply dry by diffusion, the same process by which a small drop of water on a table top dries. The particle cools by evaporation which creates a temperature difference with the surrounding air. The heat flux to the drop created by the temperature difference supplies the heat of vaporization. The water vapor thus created diffuses away from the particle. This drying time is proportional to the square of the particle diameter. Thus, small particles dry very fast.

As stated, the turbulent flow from the nozzle entrains a large quantity of room (i.e. secondary) air, and this amount is more than adequate to take up the evaporated water. This follows from the conservation of momentum as follows with reference to FIG. 5.

At station A of FIG. 5 the mass passing this location in one second is m and its velocity is v. This flow thus carries a momentum of mv past A each second. At station B the mass flow is M per second and the velocity V, which carries a momentum of MV past B each second. The chamber walls are far from the jet and hence the drag force on the walls is very small so these two momentums are essentially equal. Hence MV=mv and $$\frac{M}{m} = \frac{v}{V}.$$

Now observation shows that V is much less than v; hence M is much greater than m. That is, a large quantity of surrounding air is entrained in the flow.

Being more quantitative, the velocity v is essentially the speed of sound, 300 meters/second, both from laser velocimeter measurement and theory. The velocity from laser velocimeter measurement is approximately $v(d_o/d)$, where d is the distance downstream and $d_o$ is a constant equal to 1 cm. Thus, by 30 cm downstream the mass of entrained air is about 30 times the nozzle air.

Examining the entrainment process more precisely by application of the laser velocimeter data to the Schlichting formulae ("Boundary Layer Theory", Herman Schlichting, Trans. by J. Kestin, 6th Ed. McGraw Hill, New York, 1968, pp. 218–222 and 699–706), we find that the velocity value is in good agreement with that obtained from the laser velocimeter; while the mass entrainment value is higher by a factor of three from that given above. The difference comes about because the more exact Schlichting formulae account for the fact that much of the mass, being away from the axis, is moving slower than the velocity on axis. The actual entrainment value for the nozzle employed is probably somewhere between these two values. In either event, however, the amount of entrained air is many times the amount of nozzle air.

B SUPPLY OF HEAT OF VAPORIZATION—TEMPERATURE FALL

The water flow in the above experiments was measured to be 5.5 ml/min of 15% NaCl solution (all 6 jets). This gives 5.19 gms/min or 0.086 gms/sec of $H_2O$. At 590 cal/gm for the heat of vaporization, this requires 51 cal/sec to vaporize all the water. The nozzle air flow was 3.54 gms/sec. At 30 cm from the nozzle the entrained air is 30 times this or 106 gms/sec. The specific heat of air at constant pressure is 0.237 cal/gm°C. Hence the temperature fall of the entrained air required to supply the heat of vaporization of all the water is $$\Delta T = \frac{51}{.237} \cdot \frac{1}{106} = 2^\circ \text{ C.},$$

at 30 cm from the nozzle. If all the evaporation were completed by 15 cm, since the air entrained by 15 cm is only half that at 30 cm, the temperature drop would be 4° C. These values show that even with the conservative value of entrainment, the entrained air can supply the heat of vaporization with only a drop of a few degrees.

c. RISE OF HUMIDITY OF ENTRAINED AIR DUE TO EVAPORATION

It was appropriate to determine whether the evaporation of all the water would raise the relative humidity of the entrained air sufficiently to limit evaporation. Let $\alpha$ denote the relative humidity (as a fraction, 1=100% humidity) of the room air. Let M denote the mass of the entrained air in gms/sec. Let a (T) denote the saturation mixing ratio, that is the grams of $H_2O$ per gram of air for 100% humid air at temperature T. Then the mass of water vapor in the entrained air from the room is $\alpha_1 M a(T_1)$, where $T_1$ is the room temperature. Let w denote the water flow rate from the nozzle. If all the water evaporates, the mass of water in the entrained air is then $\alpha_1 M a(T_1)+w$. This air is now at temperature $T_2$, colder by a few degrees as described in the preceeding section. The mass of water this air could hold if saturated is $M a(T_2)$. Thus the resulting relative humidity is $$\alpha_2 = \frac{\alpha_1 M a(T_1) + w}{M a(T_2)}.$$

This may be rewritten $$\alpha_2 = \alpha_1 + \alpha_1 \frac{a(T_1) - a(T_1)}{a(T_2)} + \frac{w}{M a(T_2)}.$$

The last term represents the increase in the relative humidity due to the evaporation of the water particles, and the middle term represents the increase in relative humidity due to the cooling.

Applying this formula to the case where the evaporation is completed by 30 cm downstream where the entrained air mass M is 106 gms/second, one has $$\alpha_2 = \alpha_1 + \alpha_1(0.126) + 0.066.$$

Here the room temperature $T_1$ has been taken as 20° C. and the temperature after evaporative cooling $T_2$ is 18°

C. The saturation mixing ratios for these temperatures are 0.0138 and 0.0123 respectively, obtained from the Smithsonian Meteorological Tables. For 40% relative humidity this gives an increase of 6.6% from the added water and 5% due to cooling. The total increase of 11.6% gives a humidity at 30 cm of 51.6%. Thus, even with the conservative entrainment value, the entrained air by 30 cm is capable of evaporating all the water with only a small increase in relative humidity.

One might note in passing that the nozzle air by itself is incapable of evaporating the full water flow. Even if the nozzle air were dry it would become fully saturated when 57% of the water had evaporated.

d. TEMPERATURE PROFILE ALONG THE FLOW

For jets in the pressure range of the nozzle employed, the flow goes sonic at the nozzle exit. The absolute temperature drops at the nozzle exit by the factor $2/(1+\gamma)$, where $\gamma$ is the ratio of specific heats of air. This is a 49° C. drop in temperature and the flow velocity is 314 m/sec. At this velocity the time to travel 1 cm is only 30 microseconds. A 5 micron diameter water drop in this cold air would fall in temperature only 1° C. in this 30 microseconds. During the next centimeter of travel the flow velocity decreases and the temperature of the air rises. Even without entrainment the decrease of velocity reduces the temperature fall to 11° C. by the end of the second centimeter. With entrainment one would expect this fall of air temperature to be only about 6° below the room temperature. The rate of cooling of the particle thus rapidly reduces so that by the end of the second centimeter, at a time of 80 microseconds, a 5 micron drop would be only about 1.5° C. below room temperature.

As the flow progresses further from the orifice, the air temperature rapidly returns to room temperature and no further cooling of the particle takes place.

Thus, in spite of the rather severe cold environment at the nozzle, the time spent by a particle in this environment is so short that the particle does not appreciably cool nor does it freeze. The aerodynamic theory predicts that the temperature of the flow and the particles is essentially room temperature except for the first centimeter or two from the nozzle. Thus, the constant air temperature assumption used in the next section on particle evaporation is reasonable.

e. EVAPORATION TIME

Up to this point it has been established that the entrained air has sufficient heat capacity to evaporate all the water with only a few degrees drop in temperature and only a few percent increase in humidity. Moreover, the air temperature in the flow is essentially room temperature.

This leaves the question of whether there is enough time for the evaporation to take place. First, note that the air drag force on small spheres is so large compared to their kinetic energy that small spheres quickly come to the velocity of the air around them. A simple calculation shows that a 20 micron diameter sphere injected into still air at the speed of sound would come to rest in about 7 cm and in a time of about 4 milliseconds. Smaller spheres would come to rest even quicker. Thus it is reasonable to consider first the evaporation time of a sphere at rest relative to the surrounding air. This in fact will give the longest evaporation time, for relative motion can only increase the evaporation.

The evaporation takes place as follows: Evaporation cools the sphere whereupon heat from the surrounding air diffuses toward the sphere. The heat capacity of the sphere is so small compared to the thermal conductivity of air that this initial transient takes place very quickly. For a 5 micron diameter sphere this initial transient takes about 0.4 ms and this time is proportional to the square of the particle radius. Since the time to traverse 30 cm is 30 ms, it is appropriate to consider only the steady state situation, ignoring the initial cool down transient. This time was measured by two experimental methods, viz., integration of velocity as determined by laser velocimeter, and the water vibrator method employing a vibrator on the water line to modulate the flow. The laser velocimeter method measured the velocity on the jet axis, while the vibrator method measured the transit time averaged over the entire jet.

In the steady state evaporation process, heat is diffusing inward and $H_2O$ vapor is diffusing outward. The inward heat flux exactly supplies the heat of vaporization of the outgoing vapor. The temperature of the particle adjusts itself so this balance is achieved. Quantitative evaluation of this steady state evaporation process leads through a series of equations to determine the time it takes a particle to dry. The mathematics leading to such equations shall not be recited here. However, the drop temperature equations and the evaporation time equation are formulated using inter alia numerical values of certain variables from the Smithsonian Meteorological Tables.

Figure 6:
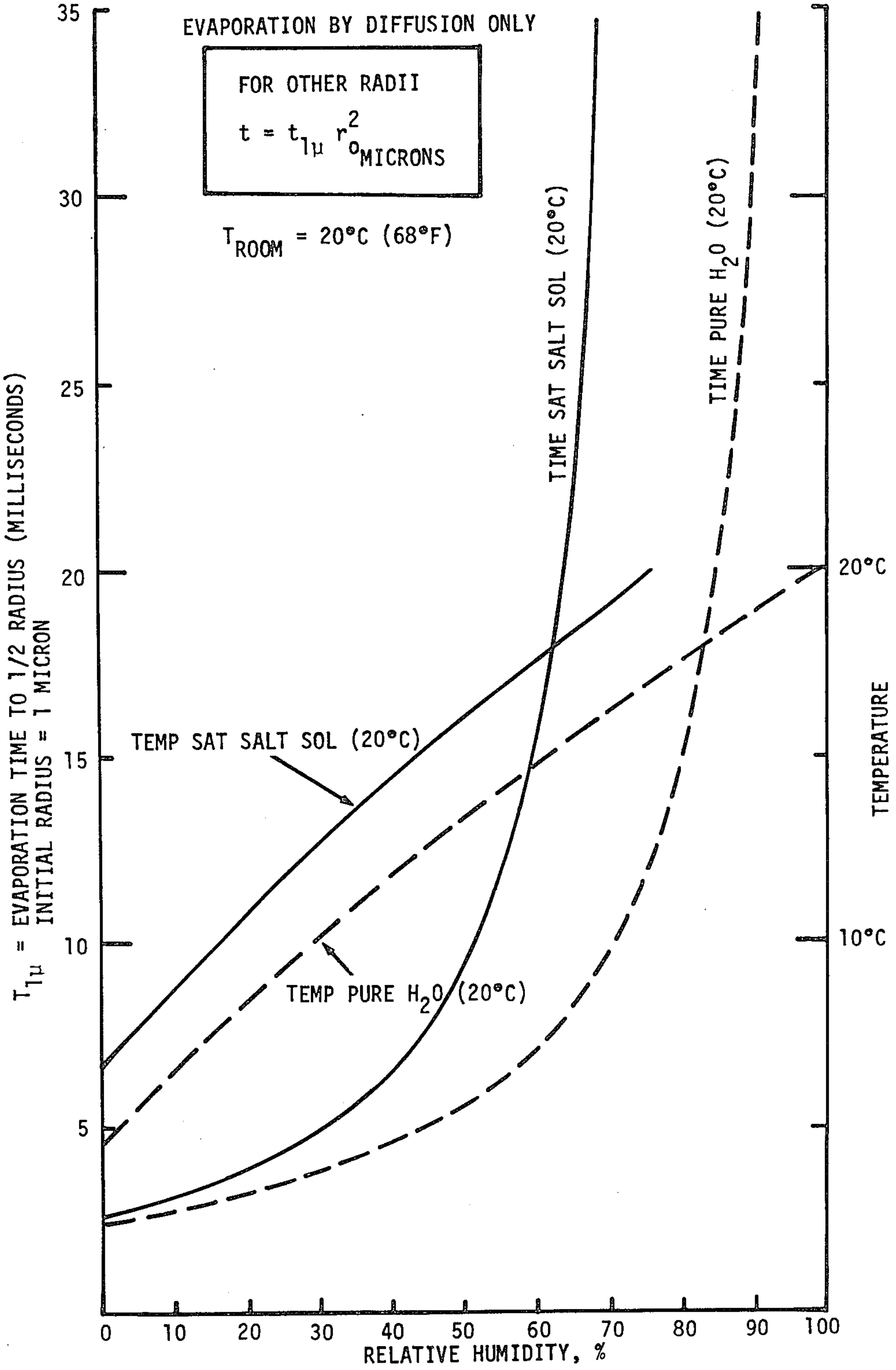
FIGS. 6–8 are charts illustrating the physical characteristics of particles and fluids affected by the process of the invention.

FIG. 6 shows the results of the evaporation by diffusion process described by the aforesaid equations. Temperature of air away from the particle is 20° C. (68° F.), and the drop temperature is seen to be an approximatey linear function of relative humidity, falling about 13° below the room temperature at zero humidity but not freezing. The evaporation time is given for a one micron radius drop (2 micron diameter) and is proportional to the radius squared. At 30% humidity a 1 micron radius drop of saturated salt water evaporates in 5 milliseconds. Hence, in the travel time to 30 cm from the nozzle (about 30 milliseconds), a drop of diameter 5 microns or less will have evaporated (dried). Note also that the plot shows that if the humidity approaches 75% or greater, the process does not work.

Figure 7:
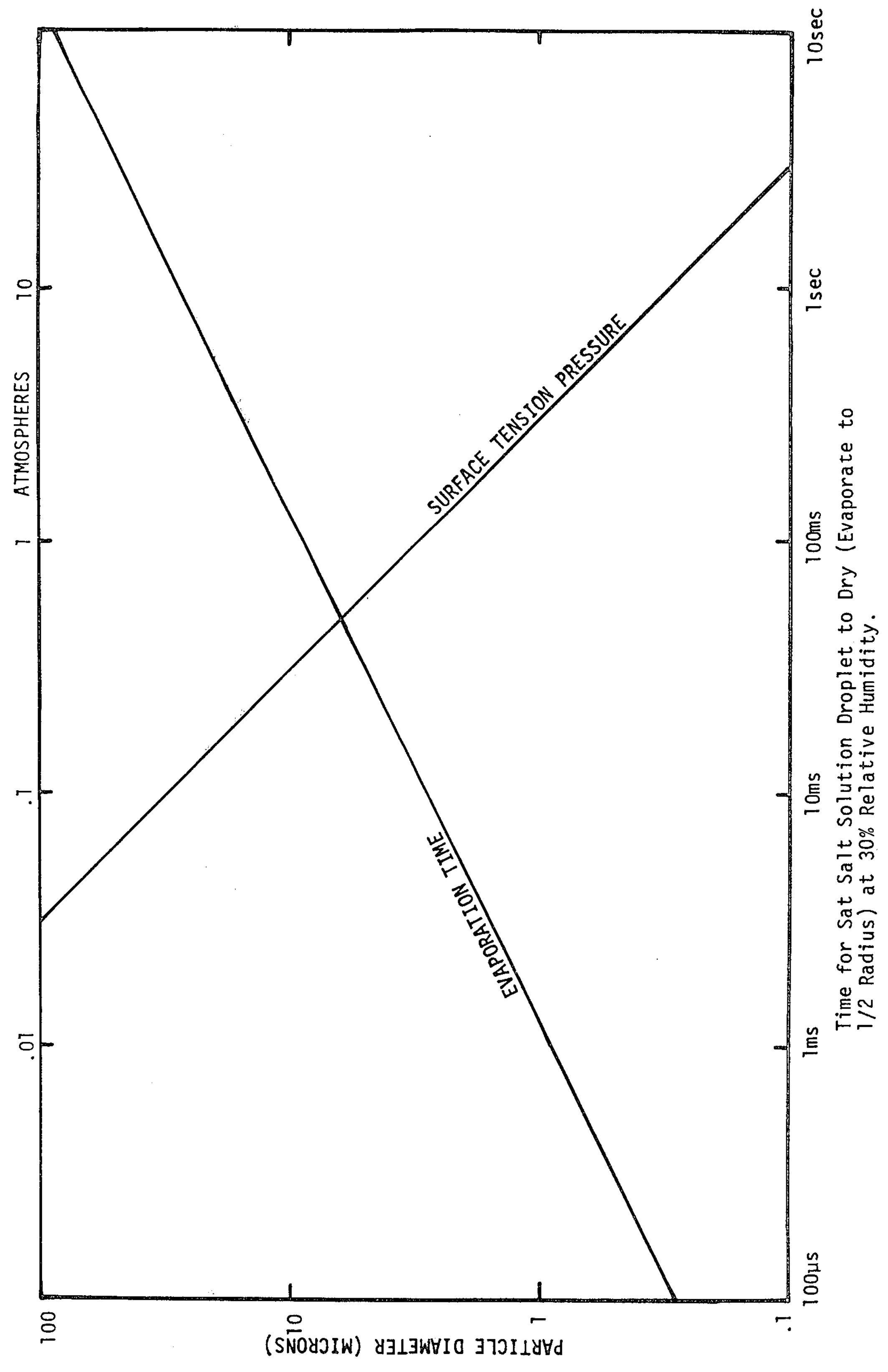
Figure 8:
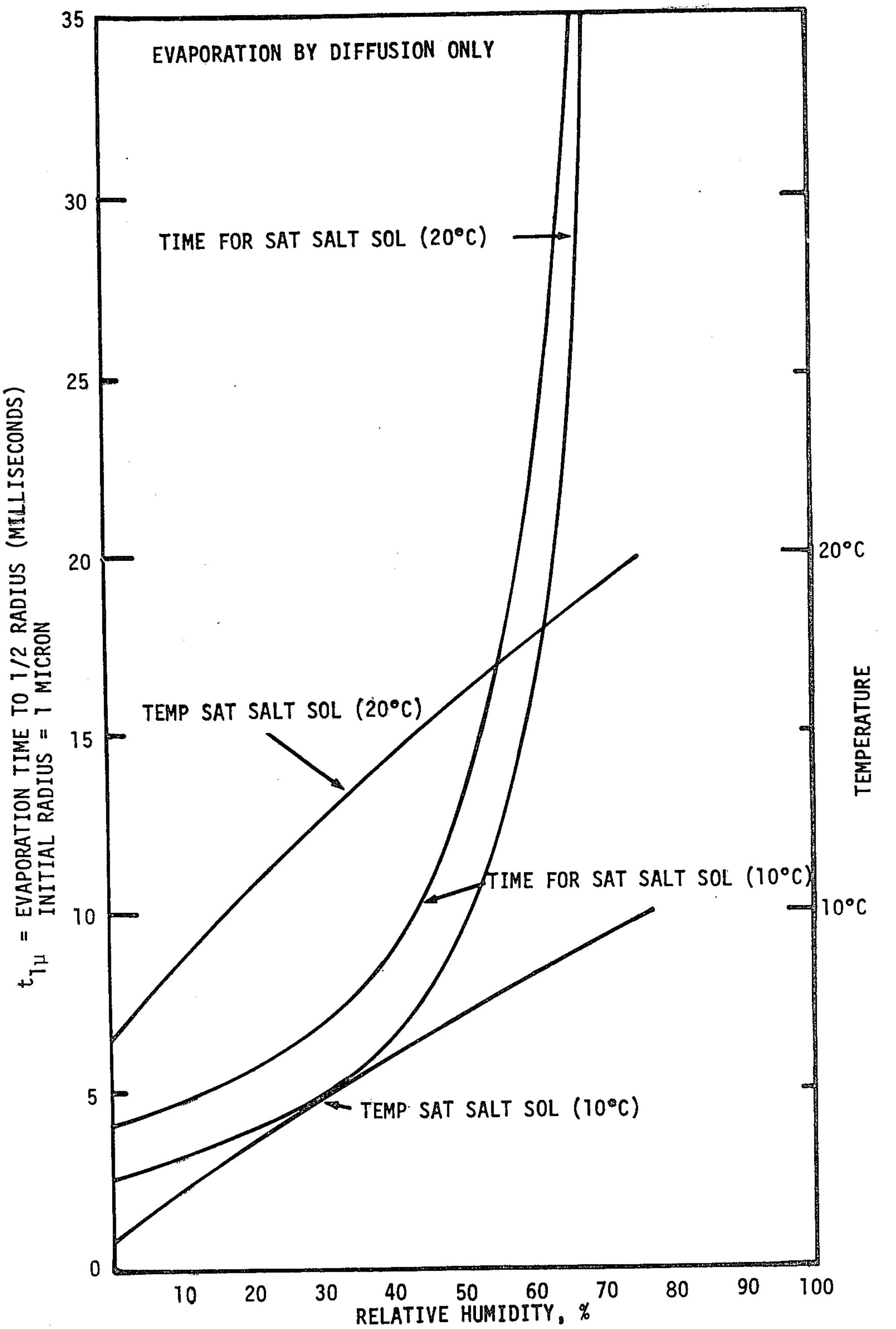

FIG. 7 shows the evaporation time at 30% humidity for saturated salt solutions as a function of particle diameter. FIG. 8 shows the effect of lowering the room temperature from 20° C. (68° F.) to 10° C. (50° F.).

The conclusion from this quantitative analysis of the evaporation time is that particles with initial diameter of 5 microns or less will be dry by the time they are 30 cm from the nozzle. A 15% salt solution particle upon drying completely, even if it dried to a sphere of NaCl of solid density 2.165, is still 43% of its initial size. Thus, in terms of final dry diameter, particles of 2 microns or less will have had time to dry by 30 cm from the nozzle.

f. INTERPRETATION OF EVIDENCE FOR PARTICLE SIZE

Three types of experiments were made which give information on the particle size: the rear illuminated holographic images, the settling experiments, and the side scattered holographic images.

The information from the rear illuminated holographic images is simply that the particles cannot be large, say 30 microns or greater, for, if so, they would have produced images of sufficient quality to be conspicuously observed and measured.

The settling experiments, with correction for convection current, the effect of the random large particles, etc., convinced the investigators that the representative particle size was about 1.5 microns.

Evaluation of the data and observations from the side scattered holographic imaged place the particle size in the area of 1.5 to 3.0 microns diameter.

GENERAL CONSIDERATIONS

The length of the operating path, i.e., the distance travelled by the droplets from the plane of projection to the plane of separation, will vary with the mass and density of the liquid composition and the solids content thereof. The length of the path will also vary with the initial velocity and energy of momentum imparted to the droplets at the point of projection into the entrained air. In the case of dehydration of the salt solutions, the path length varied from about 9 to about 14 inches. With other liquid systems, the path may reach as far as 30 inches and still produce good separation.

To keep the path as short as possible and, therefore, increase the degree of separation, it is important that the system be operated so that the droplets entering the entrained air be in the range of 0.5 to 6 microns, preferably 1 to 3 microns in diameter. The greater the relative amount of solid in the initial droplet, the greater the speed of evaporation of the liquid thereon, and thus the shorter the particle travel path. The size of the initial projected droplets may be varied according to the size of the ultimate solid particle to be released. The initial size will be determined by the content of the solid phase, which will determine the volume of the ultimate solid particles separated.

The velocity of the projection presents no problem. Speeds of 600 to 800 feet per second are adequate for low density solutions. Higher density solutions or slurries may function better at higher projection speeds, e.g., up to sonic speeds. A simple test operation will determine the appropriate speed depending upon the type of spray apparatus used.

Since the process is basically one of evaporation, it stands to reason that for the evaporation to continue at the desired rate, the entrainment air must be capable of picking up the evaporated moisture. The relative humidity of the air in the entrainment zone must be kept sufficiently below saturation. In the salt dehydration experiments described herein, relative humidity above about 61% was not experienced, but as seen from the graphs, calculations indicate that at relative humidity above about 70%, the evaporation process may slow down or cease altogether. In the drying of sugar, relative humidities below about 30% should be maintained. Relative humidity is easily controlled by flowing dry air through the air chamber.

Having described the invention so that it may be understood and practiced by one skilled in the art,

What is claimed is:

1. Method for the rapid separation of a liquid composition which contains solid dissolved or suspended therein which comprises:

(a) atomizing said composition to droplets substantially in the range of 0.5 to 6.0 microns in diameter;

(b) projecting the atomized droplets in the form of a spray at a velocity of 600 feet per second to sonic velocities directly into a mass of relatively dry, ambient, unheated air maintained at substantially standard temperature in an entrainment zone;

(c) separating dry solid particles from liquid evaporated from the droplets within a short distance of the point of projection into the entrainment zone; and (d) recovering separated solid particles from the entrainment zone.

2. Method of claim 1 in which the liquid is atomized by passage under pressure through a pneumatic atomizing venturi valve.

3. Method of claim 1 in which the liquid is atomized by contact with a cup-shaped spinning disk rotating at a speed of approximately 50,000 rpm.

4. Method of claim 1 in which the liquid is atomized to a particle size in the range of 1 to 3 microns in diameter.

5. Method of claim 1 in which the atomized liquid particles are projected into the air entrainment zone at a speed of approximately 800 feet per second.

6. Method of claim 1 in which solid particles are separated within 30 cm. of the point of ejection into the entrainment zone.

7. Method of claim 1 in which the entrainment zone is surrounded by an electrostatic field capable of concentrating the path of the separated solid particles.

8. Method of claim 1 in which the relative humidity of the air in the entrainment zone is maintained below about 75%.

9. Method of claim 1 in which the liquid-solid composition is an aqueous salt solution.

10. Method of claim 1 in which the liquid-solid composition is an aqueous food composition.

11. Method of claim 1 in which the liquid-solid composition is an aqueous rubber latex.

12. Method of claim 1 in which the liquid-solid composition is an aqueous colloidal whey.

* * * * *